July 4, 1967 P. H. PIN ET AL 3,328,996
DEVICE AND METHOD FOR MANUFACTURING ELBOW FITTINGS
FROM STRAIGHT TUBING
Filed Feb. 18, 1964

United States Patent Office 3,328,996
Patented July 4, 1967

3,328,996
DEVICE AND METHOD FOR MANUFACTURING ELBOW FITTINGS FROM STRAIGHT TUBING
Pouw Houw Pin, Delft, and Arie Verkaik, Rotterdam, Netherlands, assignors to Nederlandse Organisatie Voor Toegepast-Natuurweten-Schappelijk Onderzoek Ten Behoeve Van Nijverheid, Handel En Verkeer, The Hague, Netherlands, a corporation of the Netherlands
Filed Feb. 18, 1964, Ser. No. 345,650
Claims priority, application Netherlands, Feb. 20, 1963, 289,205
8 Claims. (Cl. 72—301)

This invention relates to a device and a method for manufacturing elbow fittings from straight tubing, especially right angle elbows, either square or curved, from metal tubing, such as for instance copper tubing.

The blending of tubes into long radius bends can be effected in various manners with the aid of bending devices or by hand and causes very few problems. To this end, the tubes are generally filled up with some substantially incompressible medium such as water, oil, wax, sand, rubber or the like, after which they are bent into the desired shape about a saddle having the required radii of curvature. However, the production of right angle bends having a very short radius of curvature, such as sharp-edged fittings, always remains an extremely difficult job, because for this purpose a saddle must possess exceptionally unfavourable radii of curvature and the elongation of the material on the outside of the elbow must be exceptionally large. This elongation gives rise to a great decrease in thickness at that point and a great risk of tearing, buckling or flattening. It is even impossible to make square elbows by bending tubing.

It is the object of the invention to manufacture square and curved fittings from straight tubing in an exceptionally simple manner, whereby the above-mentioned drawbacks are avoided.

For this purpose use is made of a device according to the invention comprising two die halves coupled together within a frame, the said die halves being movable with respect to one another parallel to their surface of contact, each half being provided with a bore which gives into the surface of contact and, in at least one of the bores, a pressure transmitting plunger, being adapted to be moved in the direction towards the surface of contact with the aid of a pressure source, and at least one of the halves in the part adjacent to the surface of contact being provided with a grooved linking up with the bore, into which groove a cam, which is mounted on the other half, fits movably.

According to the invention, it is preferred for each die half to be provided, in the part adjacent to the surface of contact, with a groove linking up with the bore and with a cam fitting movably into the groove of the other die half.

The pressure sources are preferably formed by hydraulic jacks, which can be controlled according to a programme.

According to the invention, in a device of this type a straight piece of tubing is provided in the aligned bores of the contiguous die halves and is filled up with a substantially incompressible medium, which is locked into the tube by means of at least one pressure transmitting plunger, after which the plunger, with the aid of the pressure source, brings such a pressure to bear on tube and medium as to cause a plastic deformation of the material of the tube and a lateral displacement of the die halves with respect to one another over a determined length. The original straight tubing is then formed into a double elbow fitting. After this double elbow fitting has been released from the die halves, it can be divided in two and worked up into a couple of elbow fittings ready for use.

In certain determined shapes of bent fittings, it is recommended according to this invention, to bring an additional force to bear on one of the die halves in the direction of the groove, for the initiation of the displacement.

The invention is further described hereinafter with the aid of an embodiment by way of example of a device for the production of elbow fittings according to the invention.

Figure 1:
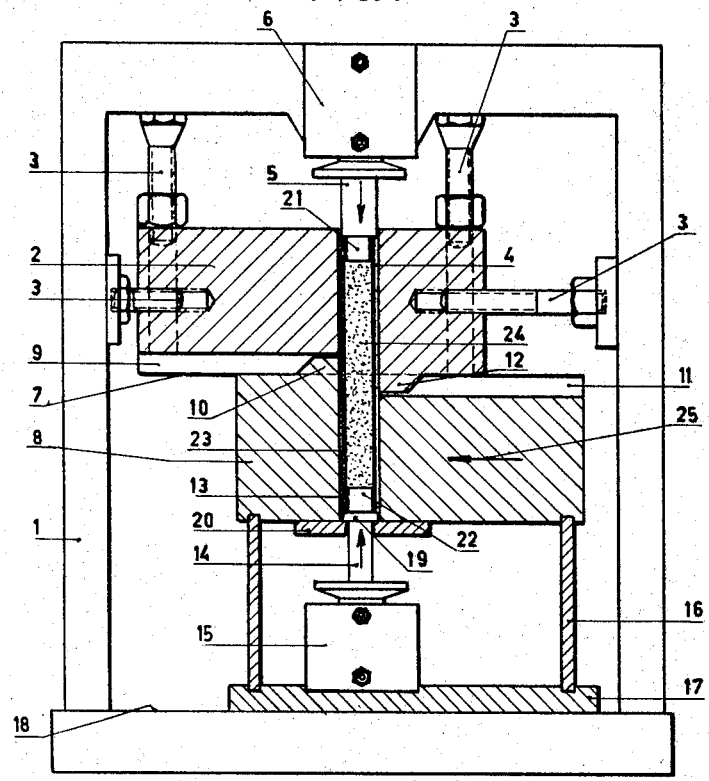
FIGURE 1 shows a longitudinal cross-section of such a device for the production of square elbows.

An upper half 2 of a die is detachably fastened in a closed frame 1 with the aid of bolts 3. In this die half is recessed a cylindrical bore 4, in which a pressure transmitting plunger 5 can be moved with the aid of a hydraulic jack 6. At the lower side of the upper half 2 there is situated the surface of contact 7 with the lower half 8 of the die. In the upper half 2 there is recessed a half-cylindrical groove 9 in the part adjacent to the contact surface 7, and into this groove 9 there fits a cam 10 of the lower half 8.

The lower half 8 too is provided with a half-cylindrical groove 11 which is adjacent to the surface 7, into which groove 11 fits a cam 12 of the upper half 2. This groove 11 links up with a cylindrical bore 13 in the lower half 8, in which a pressure transmitting plunger 14 can be moved in the direction of the contact surface 7 with the aid of a hydraulic jack 15, in the same manner as in the upper half. The lower half 8 is supported by a carrier 16 having a foot plate 17, onto which the jack 15 is mounted. The foot plate 17 can be moved on a gliding surface 18 which is provided in the frame 1 parallel to the contact surface 7, a lubricant being inserted between, so that the lower half 8 can be shifted with respect to the upper half 2.

In order to prevent the pressure transmitting plunger 14 from falling out of the bore 13, the said plunger is provided with a collar 19 which can be supported on a carrier plate 20 which is fixed under the lower half 8. For the rest the pressure transmitting plungers 5 and 14 are additionally provided with journals 21 and 22, which fit into a tube 23 which is to be bent, and which can lock a substantially incompressible medium 24 into the said tube.

The operation of this device is as follows.

A straight piece of tubing 23 is placed into the aligned bores 4 and 13 about the journal 22 of the pressure transmitting plunger 14. After this, the substantially incompressible medium 24 in the form of oil, rubber or a similar material is introduced into the tube 23 and locked in with the journal 21 of the pressure transmitting plunger 5. After this, the die halves are placed in the frame 1, half 2 being adjusted by the bolts 3 and aligned with half 8 with the carrier 16 and the plate 17 on the gliding surface 18. Then the jack 6 is put into operation, whereby the medium 24 is compressed by the pressure transmitting plunger 5. The tube 23 is pressed firmly against the walls of the bores and the journals of the pressure transmitting plungers disappear completely into the tube 23. The amount of medium 24 is chosen in such a way that the pressure from the jacks is further transmitted via the plungers directly to the tube 23, whilst the medium naturally remains under pressure.

Subsequently, the jack 15 is also put into operation and by means of the two jacks the pressure is evenly increased, until the tube 23 is loaded to such an extent that it becomes subject to plastic deformation.

Figure 3:
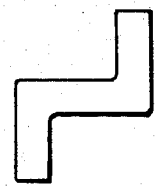
FIGURE 3 shows a double square elbow, produced with the aid of the die halves according to FIGURE 1.

Because the lower half 8 of the die can be moved on the gliding surface 18 and the load gives rise to a free force from the tube 23 against the cams 10 and 12, the lower die half 8 starts moving with respect to the upper die half 2 in the direction of the arrow 25, and the tube is formed into a double square elbow as shown in FIGURE 3.

In a copper tube of 16/14 mm. having a length of 121 mm. a rubber string having a diameter of about 14 mm. and a length of 113 mm. has been used as substantially incompressible medium which is compressed by 11 mm. by the plungers. The filling had to be compressed under a 2 ton pressure from the jack 6, before the pressure transmitting plungers could bear directly on the tube 23. Subsequently, the pressure was increased to about 8 tons by using both jacks, which initiated the displacement of the die halves. The load was kept at 8 tons, the pressure transmitting plungers shifting in their bores in axial directions, until a mutual displacement of the die halves amounting to 45 mm. was reached.

With this device and method a double square elbow according to FIGURE 3 was obtained, which, after the removal of the die halves from the frame 1, could be taken out of the bores and grooves.

Figure 2:
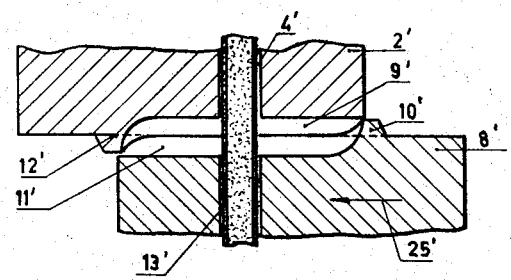
FIGURE 2 shows a variant of the die halves for the production of curved elbows, on a larger scale and in detail.

For a curved elbow fitting a variant of the groove and the cam in the die halves has been used, which is shown in FIGURE 2. Herein, the bore at the end of the groove 9 is not situated near the cam 12 as in FIGURE 1, but a groove 9' continues past the bore 4' and has an inclined part rising toward a cam 12', which fits into the corresponding by formed groove 11' of the lower die 8', which groove 11' runs on past the bore 13' as far as to a gradually rising cam 10'. When using this construction, which is necessary for obtaining a curved outer bend in the elbow, it is recommendable to initiate the displacement of the die half 8' with respect to the die half 2' with the aid of an additional force operating along the direction of the arrow 25'. When manufacturing such a curved elbow starting from the same copper tube size 16/14 mm., this additional lateral force is about 1 ton.

This force is exerted after the jack 6 has exerted a pressure of 2 tons and the movement does not take place until the pressure from the jacks 6 and 15 has been increased up to 5 tons. The pressure rises up to 7.5 tons.

It is clear that, although in this case cylindrical bores 4 and 13 and a half-cylindrical form of the grooves 9 and 11 fitted to these were started from, it is possible to give these bores 4 and 13 an elliptical, a square or any other shape and yet retain the principle, provided the pressure transmitting plungers are adapted to this form, whilst the grooves 9 and 11 too can possess an arbitrary cross-section, provided the cams 10 and 12 can be moved in these grooves.

In order to keep the load of the various surfaces as light as possible it is recommendable to make the foot plate 17 and the sliding surface 18 too very large, and cover them with a sufficient amount of lubricant in the form of oil or graphite or mobylene disulphide.

From the view-point of an easy production of the die halves, the grooves can be constructed as continuous channels and the cams can be provided in the desired place in one die half as insertions which may be capable of being shifted or not, whilst they movably fit into the opposite groove of the other half.

However, it is also possible to use a shaping, for instance when the elbow has a right angle cross-section, which provides for a groove in one half of the die only and for a cam on the other half die. However, the contact surface of the die halves is then situated not in the centre line of the horizontal part of the bent tube but at its upper or lower side.

It is recommendable for the bores 4 and 13 to be perpendicular to the surface 7, so that right angle elbow fittings are obtained. But it is quite possible also to produce sharp as well as obtuse elbows in this fashion, but in that case a control of the lateral displacement of the die halves is imperative. This control can be obtained by providing a power source with a pressure direction parallel to the arrow 25.

If it is exceptionally easy to bring the material of the tube to plastic deformation, it is possible to exert a sufficient pressure on the tube 23 and the medium 24 with only one of the jacks 6 or 15, for the dies halves to start shifting with respect to one another. Generally speaking, however, the use of both jacks is to be preferred, because in that manner a smaller relative displacement of the tube parts within the bores and the grooves is obtained.

It has been found that in a double elbow fitting made according to this method, the wall thickness remains equal to the original wall thickness within a reasonable tolerance, whilst in loading experiments tearing occurred at the following values:

Starting tube (unannealed copper tubing 16/14 commercial quality)—450 atm.
Starting tube (annealed copper tubing 16/14 commercial quality)—275 atm.
Double bent elbow—(1) 335 atm.; (2) 345 atm.; (3) 350 atm.; (4) 385 atm.

These experiments were carried out with copper tubing of commercial quality. This does not mean that, when using the same or different dimensions and pressures, it is impossible to form tubing of steel or other material into elbows in the same manner when cold, naturally provided the pressure in the material is raised to such a degree as to give rise to plastic deformation and provided the die will stand this load.

It is apparent from FIGURE 3 that with this device a double elbow is obtained, which is afterwards cut into two parts and may subsequently be provided either with grooves or with expanded ends. However, these latter treatments fall without the scope of the invention. If, however, when applying plastic deformation according to the invention, there should have arisen deviations in the wall thickness, corrections may be effected during this final treatment. Generally, however, they are superfluous.

We claim:
1. A device for manufacturing elbow fittings from tubing comprising:
 (a) die parts coupled together within a frame, one surface of a die being in contact with a surface of another die; said parts being respectively movable parallel to said surfaces of contact;
 (b) each part being provided with a bore communicating with the surface of contact, said bore being adapted to receive said tubing, a substantially incompressible medium within said tubing;
 (c) a pressure transmitting plunger in at least one bore adapted to move towards the surface of contact;
 (d) at least one die part being provided with a groove communicating with said bore; and
 (e) a cam mounted on the other part, which fits movably into said groove.
2. A device according to claim 1 wherein each die part is provided with a groove communicating with the bore and with a cam fitting movably into the groove of the other part.
3. Device according to claim 1 wherein a pressure transmitting plunger is movable in each bore.
4. Device according to claim 1 wherein one die part is fixedly mounted within the frame and another part is supported on a bearing surface in said frame parallel to the surface of contact and is laterally movable in the direction of the groove.
5. Device according to claim 4 wherein there is provided a pressure source, which moves laterally within the frame together with the movable die part.
6. Device according to claim 1 wherein a pressure source for said pressure transmitting plunger is a hydraulic means.
7. Device according to claim 4 wherein there is provided an additional power source, which displaces the movable die part in the frame in the direction of the groove.

8. A method of making elbow fittings from metal tubing comprising:
   (a) inserting a length of said tubing in a bore transverse to contacted surfaces of axially constrained die parts;
   (b) filling said bore and tubing with a substantially incompressible plastic medium;
   (c) moving a plunger axially in said bore against said medium in the direction of said die surfaces in contact; and
   (d) shifting said surfaces by the force of said medium with respect to each other under constraint of a mating cam and groove on said surfaces in a direction transverse to the axis of said bore, whereby said tubing is bent.

References Cited
UNITED STATES PATENTS

| | | | |
|---|---|---|---|
| 382,426 | 5/1888 | Howe | 72—301 |
| 610,726 | 9/1898 | Ruete | 72—54 |
| 2,243,809 | 5/1941 | Wendel | 72—353 |
| 3,000,423 | 9/1961 | Aris | 72—301 |

CHARLES W. LANHAM, *Primary Examiner.*

L. A. LARSON, *Assistant Examiner.*